United States Patent
Ghiold et al.

(10) Patent No.: US 11,562,082 B2
(45) Date of Patent: Jan. 24, 2023

(54) CRAFTING EFFECTIVE POLICIES FOR IDENTITY AND ACCESS MANAGEMENT ROLES

(71) Applicant: Capital One Services, LLC, McLean, VA (US)

(72) Inventors: Matthew A. Ghiold, Glen Allen, VA (US); Gavin McGrew, Henrico, VA (US); Devon Powley, Reston, VA (US); Dale Greene, Jr., Mechanicsville, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/333,519

(22) Filed: May 28, 2021

(65) Prior Publication Data

US 2022/0382889 A1    Dec. 1, 2022

(51) Int. Cl.
*G06F 21/60*    (2013.01)
*G06F 21/62*    (2013.01)
(Continued)

(52) U.S. Cl.
CPC ............ *G06F 21/604* (2013.01); *G06F 21/31* (2013.01); *G06F 21/6218* (2013.01); *G06F 21/78* (2013.01)

(58) Field of Classification Search
None
See application file for complete search history.

(56) References Cited

U.S. PATENT DOCUMENTS

| 7,171,459 B2 * | 1/2007 | Sanghvi ................. G06F 9/542 709/226 |
| 9,916,450 B2 | 3/2018 | Moloian et al. |

(Continued)

FOREIGN PATENT DOCUMENTS

WO    2019244036 A1    12/2019

OTHER PUBLICATIONS

SDNShield: Reconciliating Conf ◆◆ gurable Application Permissions for SDN App Markets. Wen. IEEE. (Year: 2016).*

(Continued)

*Primary Examiner* — Venkat Perungavoor
(74) *Attorney, Agent, or Firm* — Sterne, Kessler, Goldstein & Fox P.L.L.C.

(57) ABSTRACT

Disclosed herein are system, method, and computer program product embodiments for preemptively evaluating whether roles are over-privileged within an (IAM) identity and access management system. Roles may be over-privileged when they are granted permissions to perform certain actions outside the scope granted to those roles. The evaluation occurs without submitting the certain actions to the IAM system and allows roles to be evaluated on a preemptive basis so that corrective actions may be taken to prevent unauthorized access to resources. Roles may be associated with policies which may each define different permissions for accessing resources. The evaluation may involve generating an effective policy from the policies associated with a role to provide a comprehensive view of all permissions associated with the role. The specified solution operates to generate an effective permission for accessing a resource and evaluating whether that effective permission is outside of a permissible scope of access for the role.

20 Claims, 4 Drawing Sheets

(51) Int. Cl.
  *G06F 21/78* (2013.01)
  *G06F 21/31* (2013.01)

(56) References Cited

U.S. PATENT DOCUMENTS

| | | | |
|---|---|---|---|
| 10,021,138 B2 | 7/2018 | Gill et al. | |
| 10,122,757 B1 | 11/2018 | Kruse et al. | |
| 10,148,701 B1* | 12/2018 | Hecht | G06F 9/455 |
| 10,225,152 B1 | 3/2019 | Roth et al. | |
| 10,664,312 B2 | 5/2020 | Moloian et al. | |
| 10,749,886 B1 | 8/2020 | Kandel et al. | |
| 10,754,506 B1 | 8/2020 | Moyal et al. | |
| 10,803,169 B1* | 10/2020 | Flatten | G06F 21/554 |
| 11,368,492 B1* | 6/2022 | Engers | H04L 41/0894 |
| 2007/0043771 A1* | 2/2007 | Ludwig | H04L 61/457 |
| 2008/0016580 A1 | 1/2008 | Dixit et al. | |
| 2013/0329738 A1* | 12/2013 | Yamagata | H04L 47/808 370/392 |
| 2017/0034075 A1* | 2/2017 | Burk | H04L 41/0893 |
| 2019/0073488 A1 | 3/2019 | Kruse et al. | |
| 2019/0236062 A1* | 8/2019 | Proctor | G06F 16/2379 |
| 2019/0327271 A1 | 10/2019 | Saxena et al. | |
| 2020/0007677 A1 | 1/2020 | Bjontegard | |
| 2020/0076812 A1 | 3/2020 | Spurlock et al. | |
| 2020/0137097 A1 | 4/2020 | Zimmermann et al. | |
| 2020/0336489 A1 | 10/2020 | Wuest et al. | |
| 2020/0358778 A1 | 11/2020 | Gopinathapai et al. | |

OTHER PUBLICATIONS

ASCAA: API-level security certification of android applications. Pei. IET Software. (Year: 2017).*
PoLPer: Process-Aware Restriction of Over-Privileged Setuid Calls in Legacy Applications. Jeon. ACM. (Year: 2019).*
International Search Report and Written Opinion of the International Searching Authority directed to related International Patent Application No. PCT/US22/31390, dated Aug. 25, 2022; 7 pages.

* cited by examiner

CRAFTING EFFECTIVE POLICIES FOR IDENTITY AND ACCESS MANAGEMENT ROLES

BACKGROUND

Identity and access management (IAM) systems manage and control access to resources. IAM systems may be deployed on premises, provided by a third party provider, or a combination of these approaches. However deployed, an IAM system receives requests for accessing the resources from an entity, typically in an enterprise system. To determine whether to grant or deny requests, the IAM system may evaluate whether the entity has appropriate privileges for accessing the resource. This evaluation of an entity's privileges is done by the IAM system on a per-request basis as requests are received. The IAM system may then inform the entity and the enterprise system whether access to the resource is granted or denied. The enterprise system therefore only becomes aware of any security issues with its privileges for accessing resources after submitting requests to the IAM system.

IAM systems are currently limited to this reactive evaluation (i.e., after a request is sent) because privileges associated with entities in an enterprise system can be exponentially complex. For example, a cloud environment may allow entities to be associated with a number of different policies with each policy providing multiple privileges such as a read privilege or a write privilege. The complexity arises when a privilege, such as a read privilege, is defined in multiple policies (e.g., with respect to different resources) and may be associated with different versions of the same policy. The nature of how these privileges are stored—across different policies—and the sheer scale of the privileges and policies involved therefore prevent IAM systems, including those within a cloud environment, to proactively evaluate privileges associated with entities in an enterprise system.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
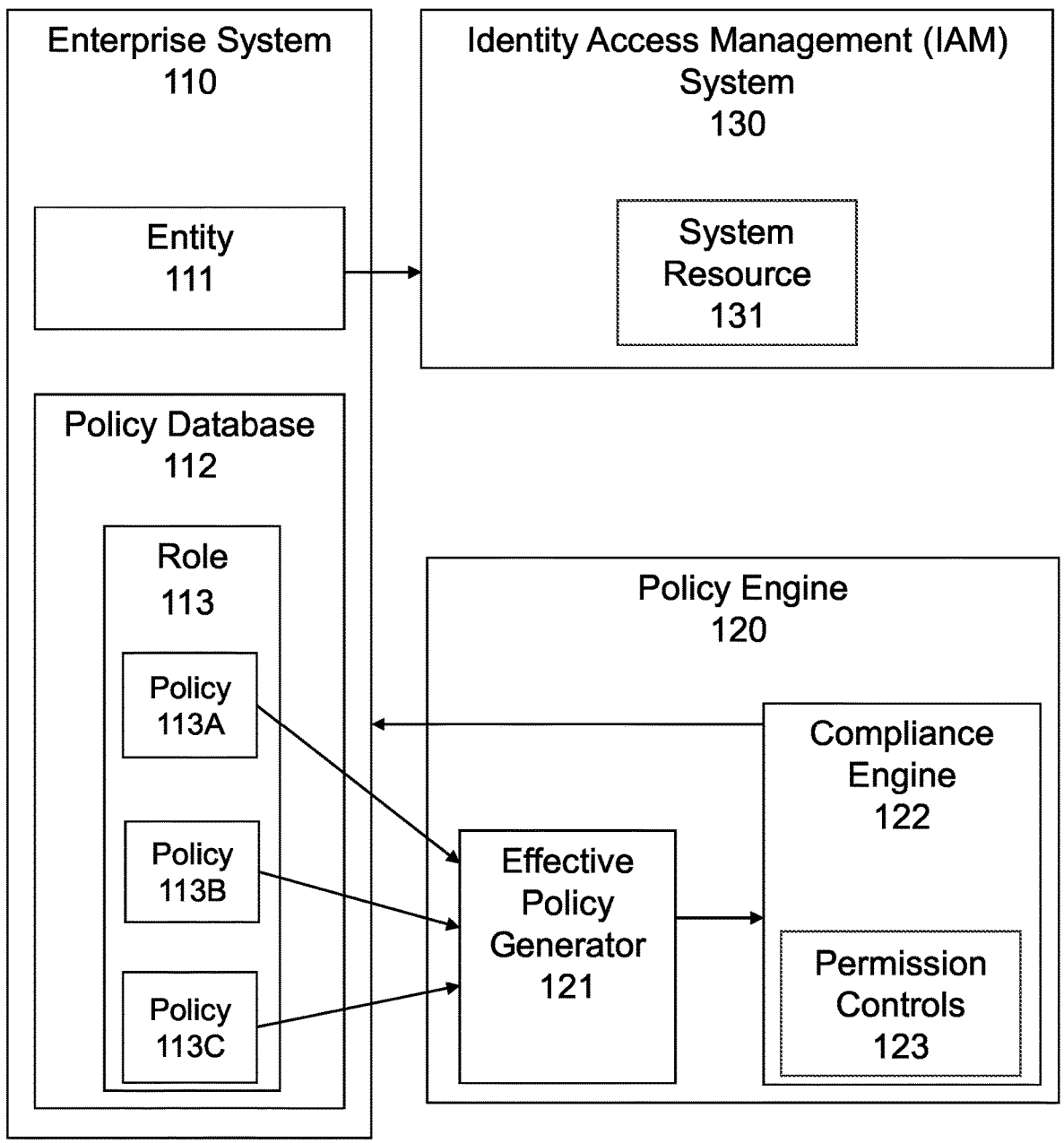
FIG. 1 is a block diagram of an environment including an effective policy generator, according to some embodiments.

What is needed is a mechanism for reducing the complexity of privilege scope for users within an enterprise system to allow the enterprise system to proactively evaluate whether user privileges are over-privileged. The features described in this disclosure shift the responsibility of privilege evaluation from an identity and access management (IAM) system to the enterprise system. Accordingly, an improved enterprise system of the present disclosure can monitor permission compliance of its roles with permission controls for accessing system resources of an identity and access management (IAM) system prior to any requests being submitted to the IAM system.

Provided herein are system, apparatus, device, method and/or computer program product embodiments, and/or combinations and sub-combinations thereof, for efficiently evaluating all permutations of permissions associated with each role in an enterprise system to determine whether the roles are over-privileged with respect to accessing system resources in an IAM system and performing that evaluation without having to submit any requests to the IAM system. An enterprise system may therefore perform preemptive evaluation of all permissions associated with a role to identify roles that have improper access to system resources.

Generally speaking, IAM systems may provide access to system resources. For example, an IAM system of a cloud provider may control access to an enterprise system's cloud resources. Access to system resources (e.g., cloud resources) includes allowing actions to be performed on the resources such as reading and writing. Examples of system resources include system processes and data structures (e.g., an Amazon Web Service (AWS) Simple Storage Service (S3) bucket). IAM systems may grant or deny access to these system resources based on permissions assigned to entities in the enterprise system. The term "entity" may refer to a role, one or more users, or a defined group of users. When an IAM system receives a request, such as from an entity in an enterprise system, that request may identify a role of the entity that allows the IAM system to evaluate permissions assigned to the role. On the basis of this evaluation, the IAM system may grant or deny access to the requested system resource. Denying access may indicate that the entity has not been assigned the appropriate permission for access to the system resource. The entity in the enterprise system may then be informed of the decision by the IAM system.

The following discussion focuses on interactions between an IAM system and enterprise system when entities in an enterprise system seek access to resources that are controlled by the IAM system. In an embodiment, the IAM system is managed separately from the enterprise system. For example, the IAM system may be managed by a cloud provider that is providing cloud resources to the enterprise system. One skilled in the art would understand that the interactions apply to any requesting system that seeks access to a system resource controlled by an IAM system using a permission-based protocol. The requesting system is therefore not limited to an enterprise system but any system that uses roles and permissions as part of determining access to the system resource. For the purpose of this disclosure, the features will be described with respect to an enterprise system.

The request-response dynamic between the IAM system and an enterprise system presents challenges to the enterprise system. First, the enterprise system is not informed of any potential issues with respect to entities in its system until a request is made to the IAM system. Any corrective action to its entities is therefore reactive and presents a potential security concern because the scope of an entity's privileges is not evaluated until a request from that entity is received by the IAM system. This request-response dynamic provides an opportunity for roles to be compromised (e.g., by a hacker), their privileges altered, and subsequently used to improperly gain access to unauthorized system resources. Second, the enterprise system must rely on the IAM system in determining whether its roles are compliant with permission controls for accessing system resources.

Preemptive monitoring of entities by the requesting system presents its own challenge. An entity may be associated with a number of policies with each policy defining a number of permissions for accessing different system resources. There may be different types of policies such as identity policies whose permissions relate to an identity, resource policies whose permissions relate to a specific resource, and permission boundaries whose permissions define a maximum scope of permissions that may be granted but do not define specific permissions. For example, an identity policy may control what actions an entity can perform on a resource (and may also define the conditions); a resource policy may also define certain permissions on certain actions that can be performed on that resource. These permissions may overlap or even conflict in scope with respect to the level of access for the role, for a system resource, or both. Because an entity may be assigned more than one policy, the number of permutations of permissions may grow exponentially large as the number of roles and policies increases. For a requesting system with a large number of entities and a large number of policies, evaluation of each entity and its associated permissions is neither efficient nor feasible. Given the possible number of combinations of permissions for any role, calculating the scope of access for each role within an enterprise system presents a daunting task.

Technical benefits described in the following embodiments solve the challenges presented by the request-response dynamic associated with IAM systems and the challenges for evaluating different permutations of permissions across different policies. In an embodiment, a user may be associated with a number of policies. Each policy may define any number of different privileges for that entity and there may be overlap in scope between different policies. For example, one policy may define read and write privileges for a system resource while another policy may limit the entity's privilege to only read privileges for the same system resource. So one policy defines a certain scope for the system resource and the other policy defines a different scope. This overlap in scope between privileges that are spread across different policies is an example of a policy interdependency. As the number of policies for a user increases, the number of interdependencies may also increase.

A comprehensive effective policy provides a means for a system to efficiently evaluate all permissions of policies assigned to a role by resolving the web of interdependencies of the different permissions to identify an effective or overall scope for that role to access a system resource. In various embodiments, this effective policy may be generated based on all policies and the effective scope may be generated based on the permissions assigned to each role. Other suitable approaches to generate the effective policy and the effective scope of access may be adopted.

IAM systems cannot preemptively perform these steps because of the complex nature of the environment: the number of entities that are provided access to the system resources, the number of policies that may be associated with each entity, the number of privileges that may be in each policy, the need to evaluate policies on a routine basis. Although enterprise systems face these same challenges, they are better situated to perform preemptive evaluation of privileges because the challenges are on a lesser scale: lesser number of entities, lesser number of policies. This is because IAM systems may manage resources for any number of enterprise systems and therefore is responsible for controlling access to larger number of entities based on a larger number of policies.

Because current enterprise systems do not generate an effective policy or otherwise resolve the interdependencies between different policies, the systems are unable to persistently and preemptively monitor its roles without requiring an interaction with the IAM system (e.g., submitting a request for a resource controlled by the IAM system). In other words, current enterprise systems do not have an efficient method for assessing an effective scope of access for system resources for each role in the manner described in further detail below.

A further technical benefit is the improvement in the functionality of the enterprise system which may now persistently monitor roles across the entire system, ascertaining non-compliance with permission controls established by the enterprise system and/or the IAM system, and provide corrective measures to any over-privileged role prior to any request being submitted to the IAM system. The enterprise system may preemptively identify any potential security concerns involving improper privileges associated with roles such as over-privileged roles or roles that have been compromised. When identified, the enterprise system may prevent any requests from that role being submitted to the IAM system. In this manner, the enterprise system may prevent security breaches associated with its roles before they occur.

FIG. 1 is a block diagram of an environment including an effective policy generator, according to some embodiments. Environment 100 may include enterprise system 110, policy engine 120, and identity and access management (IAM) system 130.

Enterprise system 110 may be implemented as any system that requests access to resources protected by IAM system 130 that utilizes policies and permissions for controlling access to requested resources. In an embodiment, enterprise system 110 may include any number of entities including entity 111 and a policy database 112. In another embodiment, policy database 112 may be implemented separately from enterprise system 110, such as in policy engine 120 and/or IAM system 130.

Entity 111 may be a user such as an employee of enterprise system 110, a group of users, or a computing device such as a machine that is installed at or associated with enterprise system 110. Entity 111 may be associated with any number of roles including role 113. Role 113 may be stored in policy database 112. Role 113 may be associated with any number of different policies such as policy 113a, policy 113b, and policy 113c. Entity 111 may submit requests for accessing system resources such as system resource 131 that are protected by IAM system 130.

In an embodiment, there may be different types of policies such as a IAM managed policy, an enterprise managed policy, or an inline policy. An IAM managed policy is a policy that is managed by the system that controls access to the system resources. In an embodiment, IAM system controls access to cloud resources so the IAM managed policy is controlled by the cloud provider. An enterprise managed policy is a policy that is managed by the enterprise system. A managed policy may be attached to multiple different entities in the enterprise system (roles, users, or groups). In contrast, an inline policy is attached to a single entity (e.g., a single role, a single user, a single group). Policy 113a, policy 113*b*, and policy 113*c* may be implemented as different types of policies such as a managed policy or an inline policy.

When implemented as a computing device, entity 111 may be a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof. Therefore, any two or more components of environment 100 may similarly be executed using some or all of the two or more computers in communication with one another. In an embodiment, entity 111 may request access to system resource 131 via any network or combination of networks including the Internet, a local area network (LAN), a wide area network (WAN), a wireless network, a cellular network, or various other types of networks as would be appreciated by a person of ordinary skill in the art. In another embodiment, entity 111 may have software installed thereon that facilitates the connection with IAM system 130.

Enterprise system 110 may also be in communication with policy engine 120 which may be responsible for evaluating policies associated with a role and that are provided by policy database 112. Policy engine 120 may be implemented as a separate component as shown in FIG. 1 or integrated as part of enterprise system 110. Policy engine 120 may include effective policy generator 121 and compliance engine 122. Effective policy generator 121 may be configured to receive policies associated with a role, such as policy 113*a*, policy 113*b*, and policy 113*c* that is associated with role 113, and generate an effective policy from the received policies. Compliance engine 122 may be configured to receive the effective policy from effective policy generator 121 and determine whether the role associated with the effective policy is over-privileged.

In an embodiment, the term "over-privileged" refers to when an entity is granted an effective scope of access to system resources that is beyond a permissible scope of access assigned to that entity. This may occur when a privilege in a first policy is changed in a manner that conflicts with or exceeds the scope of a privilege in a second policy. Scope of access may refer to the actions that can be performed on a system resource, the system resources that can be accessed, or a combination of these. In an embodiment, each policy associated with a role defines its own scope of access for the role to access system resources. An effective scope of access for an entity may refer to a scope that is defined by the different policies (and their respective scopes of action). A permissible scope of access for the role may refer to a maximum scope of access that an entity is allowed to perform.

As a non-limiting example to illustrate a role that is over-privileged, a first policy may include a first privilege that grants a role permission to read and write a system resource and a second policy may include a second privilege that restricts the role from writing to the system resource. In this example, taken separately, the first and second privileges each define different scopes for accessing the system resource. Taken together, the first and second privileges define an effective scope of access for the system resource. Here, the effective scope for the role is a read permission for accessing the system resource. In this example, the effective scope for the role lacks an edit permission because the restrictive permission is given priority over the grant permission for security purposes. And the permissible scope of access for the role may be provided by either the enterprise system associated with the role or the IAM system that provides access to the system resource. The permissible scope of access may specify that the role is not allowed read or write access to the system resource. Accordingly, in this example, the role is over-privileged because the effective scope—read access for the system resource—exceeds the permissible scope—restricted read and write access for the system resource.

Figure 2:
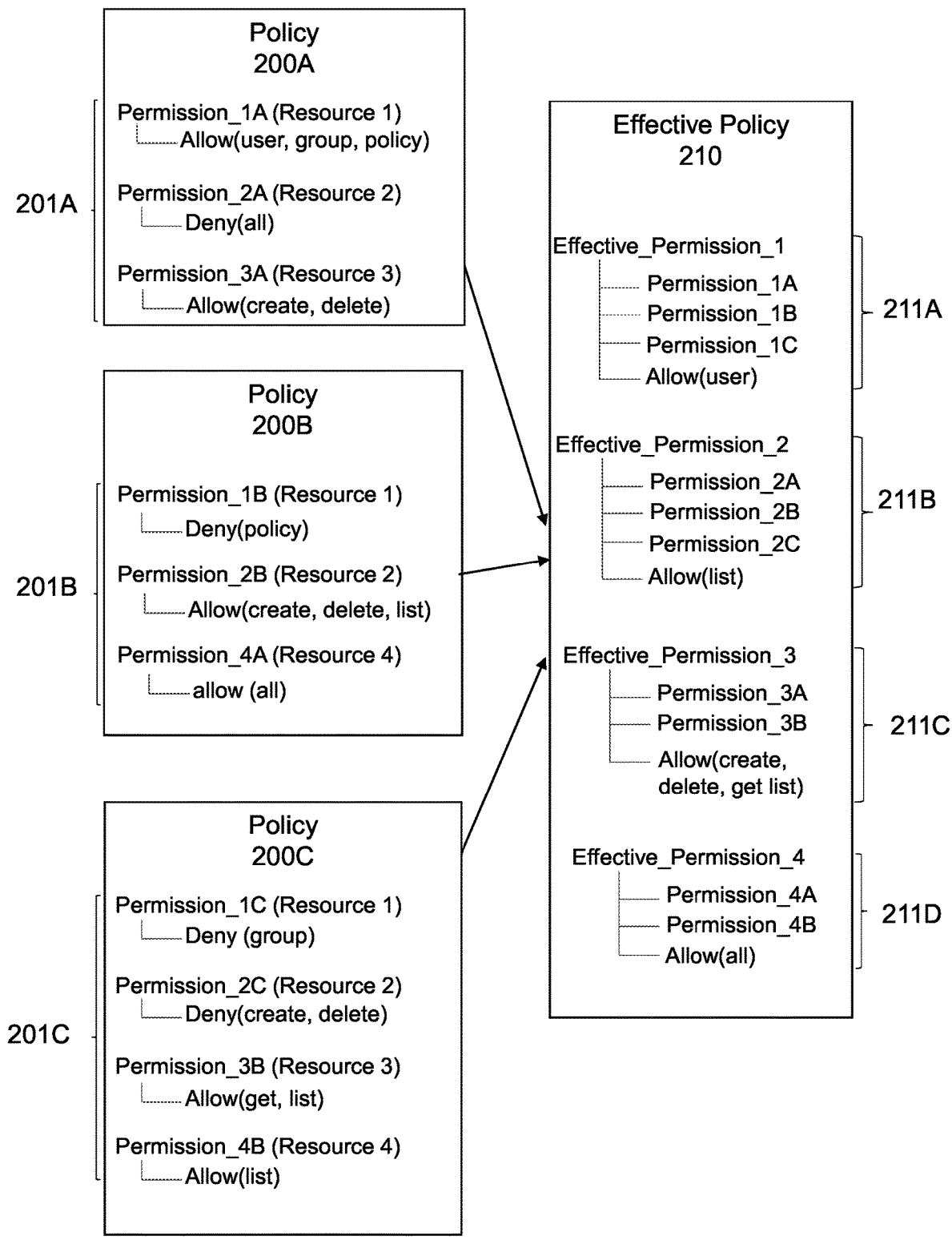
FIG. 2 is a block diagram of an effective policy, according to some embodiments.

FIG. 2 provides an exemplary embodiment for determining an effective scope of access for a role. FIG. 2 depicts policy 200A, policy 200B, and policy 200C, and effective policy 210. Policy 200A, policy 200B, and policy 200C may correspond to policy 113A, 113B, and 113C, respectively. Policy 200A may define permissions 201A for different system resources. For example, permissions 201A may include permission_1A defining a scope for accessing a first system resource (e.g., "Resource 1"), permission_2A defining a scope for accessing a second system resource (e.g., "Resource 2"), and permission_3A defining a scope for accessing a third system resource (e.g., "Resource 3"). The scope for permissions may be defined by the access privileges. For example, permission_1A may define allowed privileges for accessing functions associated with Resource 1 for users (e.g., ListUsers, DeleteUser), groups (e.g., ListGroups, DeleteGroup), or policies (e.g., ListPolicies, DeletePolicies); permission_2A may deny access to all functions associated with Resource 2; and permission 3A may define allowed create and delete functions associated with Resource 3.

Similarly, policy 200B may include permissions 201B and policy 200C may include permissions 201C. In this embodiment, permissions 201B may include permission 1B defining another scope for accessing the first system resource, permission_2B defining another scope for accessing the second system resource, and permission_4A defining a scope for accessing a fourth system resource. For example, permission_1B may define that access privileges associated with policies for Resource 1 is denied; permission_2B may define allowed privileges for accessing Resource 2 including create, delete, and list functions; and permission 4A may define that all functions are available associated with Resource 4.

Permissions 201C may include permission 1C defining another scope for accessing the first system resource, permission_2C defining another scope for accessing the second system resource, permission_3B defining another scope for accessing the third system resource, and permission_4B defining another scope for accessing the fourth system resource. For example, permission_1C may define that access privileges associated with groups for Resource 1 is denied; permission_2C may define that create and delete functions associated with Resource 2 are denied; permission 3B may define that get and list functions associated with Resource 3 are allowed; and permission 4B may define that the list function associated with Resource 4 is allowed.

Policies 200A-200C may be provided to a policy engine, such as policy engine 120, for generating effective policy 210. In an embodiment, policies 200A-200C and effective policy 210 may be in a format consistent with any requirements by the IAM system (e.g., the cloud provider). In an embodiment, permissions from policies 200A-200C may be merged to form new effective permissions in effective policy 210 which provides a singular view of the permissions associated with a particular system resource. Effective permission may provide an effective scope of access that reflects the relationship between the permissions that are defined across different policies.

For example, permissions for accessing the first system resource in permissions 201A-201C (permission_1A, permission_1B, and permission_1C) may be merged to form an effective permission 211A ("Effective_Permission_1"). Merger of permissions refers to the process of identifying permissions across policies that relate to the same system resource, identifying the scope of each permission, and then determining a single scope for the system resource based on each identified scope. This single scope may be called an effective permission for that user to access the system resource. For example, effective permission 211A provides an effective scope of access for Resource 2 and is defined by the scopes of access from permission_1A, permission_1B, and permission_1C. Merging these permissions may be based on the overlap of allowed permissions. For example, the merge of these permissions would result in an effective permission that only permissions associated with users are allowed because permission_1B and permission_1C all deny access to policy and group-related functions. Put another way, the effective scope for accessing Resource 1 is limited to user-related functions.

Effective permissions 211B-221D may similarly provide effective scopes of access for the second, third, and fourth system resources respectively. Effective policy 210 therefore defines the effective scopes of access for the role with respect to various system resources. Effective permission 211B provides an effective scope of access for Resource 2 and is defined by the scopes of access from permission_2A, permission_2B, and permission_2C. Merging these permissions may be based on the overlap of allowed permissions. For example, the merge of these permissions would result in an effective permission that only permissions associated with list operations ("ListGroups," "ListUsers," "ListUserPolicies," "ListRolePolicies") are allowed. This merger is based on permission_2A denying all functions, permission_2B allowing create, delete, and list functions, and permission_2C denying create and delete functions. Put another way, the effective scope for accessing Resource 1 is limited to list functions.

Effective permission 211C for Resource 3 may be formed by merging a permission from policy 200A, permission 3A, and a permission from policy 200C, permission_3B. Effective permission 211C provides an effective scope of access for Resource 3 and is defined by the scopes of access from permission_3A and permission_3B. Merging these permissions may be based on the overlap of allowed permissions. For example, the merge of these permissions would result in an effective permission that permissions associated with create, delete, get, and list functions are allowed. This merger is based on permission_2A allowing create and delete functions and permission_2B allowing get and list functions. Put another way, the effective scope for accessing Resource 3 is limited to create, delete, get, and list functions.

Effective permission 211D for Resource 4 may be formed by merging a permission from policy 200B, permission_4A, and a permission from policy 200C, permission_4B. Effective permission 211D provides an effective scope of access for Resource 4 and is defined by the scopes of access from permission_4A and permission_4B. Merging these permissions may be based on the overlap of allowed permissions. For example, the merge of these permissions would result in an effective permission that allows all functions. This merger is based on permission_4A allowing all functions and permission_4B allowing list functions. Put another way, the effective scope for accessing Resource 4 is limited to all available functions.

In an embodiment, the merge operation is based on detecting an overlap in allowed permissions and generates an effective permission based on the intersection of the allowed permissions. Different implementations may be used to define the effective permission when permissions conflict such as prioritizing the restrictive permission over the grant permission for security purposes.

In some embodiments, policies may be managed by enterprise system 110 or IAM system 130. For example, policy 200A may be managed (or controlled) by enterprise system 110 and policy 200B and policy 200C may be managed by IAM system 130. Policies managed by IAM system 130 may provide permissions that cannot be altered by enterprise system 110 and can only be updated or otherwise modified by IAM system 130. Policies managed by enterprise system 110 allow enterprise system 110 to customize policies for their specific environment and roles. However, policies managed by enterprise system 110 must be compliant with permission requirements established by IAM system 130 for accessing its system resources. For example, enterprise system 110 may not be allowed to grant an effective scope of access to a system resource that exceeds a permissive scope of access to the system resource as provided by IAM system 130.

In an embodiment, after permissions 201A-201D are merged to form effective permissions 211A-211D in effective policy 210, policy engine 120 may further syntactically correct the merged permissions to ensure they comply with the syntax requirements for a policy to resolve any errors in the merged permissions. For example, effective policy 210 may be formatted to comply with the requirements of the resource system (e.g., a cloud provider).

Returning to FIG. 1, compliance engine 122 receives an effective policy, such as effective policy 210, from policy engine 120. Compliance engine 122 ensures that the effective policy complies with permission controls 123. Permission controls 123 may be established by enterprise system 110, IAM system 130, or a combination. For example, enterprise system 110 may establish, independently of IAM system 130, permission controls 123 for performing internal compliance monitoring of all roles within its system. In an embodiment, the permission controls provide a permissive scope of access for each system resource in IAM system 130. Permission controls 123 may be derived from internal requirements established by enterprise system 110 (e.g., permissions associated with roles specific to enterprise system 110), requirements established by IAM system 130 (e.g., scope of read/write access for system resource 131), or a combination of both. In this manner compliance engine 122 determines whether the effective scope of access for a system resource complies with the permission requirements from enterprise system 110 and/or IAM system 130. Permission controls 123 may provide these permission requirements. In an embodiment, permission controls 123 may be represented as a listing of risky actions that are restricted by enterprise system 110, IAM system 130, or both.

In an embodiment, compliance monitoring performed by compliance engine 122 involves performing a comparison between the effective scope of access (derived from effective policy 210 for example) for a resource and a permissible scope of access (provided from permission controls 123 for example) for that resource. Each role may have a permissible scope or scopes for a specific resource. The permissible scope may be dynamic and can vary based on context of the requested action, permissions, and environmental factors such as administrative input, contextual flags, user action, and changes to the requested resource. The permissible scope may also be independent of each resource so that each resource may have a set of permissible scopes for different roles. For example, a resource may have one permissible scope for one role and a different permissible scope for another role. When the effective scope of access exceeds the permissible scope of access, the role associated with the effective policy may be determined to be over-privileged. In an embodiment, the comparison between the effective scope and permissible scope may compare the number of permissions identified by the effective scope of access with the permissible scope of access. In this embodiment, the role may be determined to be over-privileged when the number of permissions identified by the effective scope of access exceeds the number of permissions in the permissible scope of access.

In an embodiment, compliance engine 122 may generate a notification indicating that a role is over-privileged. The notification may be transmitted to enterprise system 110 to allow enterprise system 110 to take corrective action with respect to that role. For example, the role may be disabled or restricted from transmitting requests for system resources until the corrective action is taken. In an embodiment, the notification may include the corrective action indicating the permission or permissions that result in the role being considered over-privileged. Actions taken against a role may impact user accounts associated with that role. For example, if an administrator role is found to be over-privileged, any user accounts associated with the administrator role may be disabled or restricted from transmitting requests until the over-privileged permission is corrected. In an embodiment, the notification may lock a role for which a over-privileged permission has been detected. The role may be unlocked after any over-privileged permissions in the role have been corrected. In an embodiment, the notification may trigger a remediation process for correcting any issues involved with a role in which an over-privileged permission has been detected. In an embodiment, the notification may also be transmitted to IAM system 130 so that IAM system 130 may also track compliance with its permissive scope of access for its resources.

In an embodiment, because determining whether roles are over-privileged occurs independently of access requests to IAM system 130, compliance engine 122 may efficiently perform persistent monitoring of its user roles to determine whether all its roles are compliant with permission controls established by enterprise system 110 and/or IAM system 130. Without the effective policy of this disclosure, enterprise system 110 would be required to submit requests from each role for each policy and for each permission in order to evaluate whether a permission is allowed for that role. With the roles and policies in an enterprise system potentially numbering in the hundreds of thousands, the number of permutations of permission combinations for a role becomes restrictively large. Compliance engine 122 may utilize effective policies to efficiently evaluate permissions by reducing the number of permutations into an effective scope of access for system resources. Accordingly, compliance monitoring may occur as needed: weekly, daily, or even 24/7. For the reasons discussed above with respect to the complexity of the interdependencies of permissions, such frequent compliance monitoring was not previously possible.

IAM system 130 provides access to system resources such as system resource 131. IAM system 130 may receive requests for access to system resource 131 from entities in enterprise system 110 such as entity 111. IAM system 130 may include a plurality of data storage systems for storing system resources, including system resource 131, to be accessed by enterprise system 110. IAM system 130 may be a database management system or relational database tool. IAM system 130 may further be a message queue or stream processing platform such as Apache Kafka or Apache Spark or other data storage systems like Apache Hadoop, HDFS, or Amazon S3, to name just some examples. IAM system 130 may be a data lake, data silo, semi-structured data system (CSV, logs, xml, etc.), unstructured data system, binary data repository, or other suitable repository. IAM system 130 may store thousands, millions, billions, or trillions (or more) of objects, rows, transactions, records, files, logs, etc. while allowing for the creation, modification, retrieval, archival, and management of this data.

The request-response interactions between enterprise system 110 and IAM system 130 may be considered to occur independently of the policy evaluations performed by policy engine 120. In this manner, enterprise system 110 may determine compliance of its roles and policies independent of submitting requests for system resources to IAM system 130. For example, enterprise system 110 may communicate with policy engine 120 without having to submit requests to IAM system 130.

Figure 3:
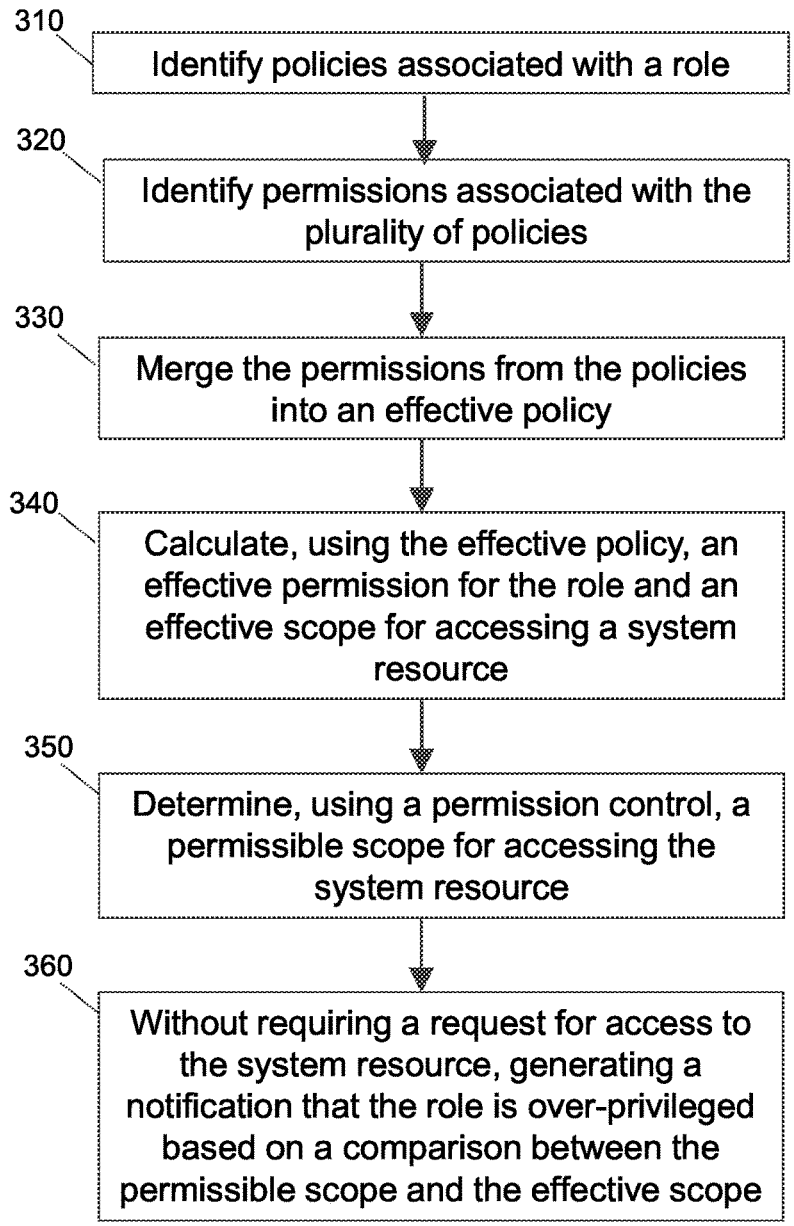
FIG. 3 is a flowchart illustrating a method for performing compliance monitoring of roles, according to some embodiments.

FIG. 3 is flowchart illustrating a method 300 for performing compliance monitoring of roles, according to some embodiments. As a non-limiting example with regards to FIGS. 1 and 2, one or more processes described with respect to FIG. 3 may be performed by a policy engine (e.g., policy engine 120 of FIG. 1) for generating effective policies from policies provided by a policy database (e.g., policy database 112 of FIG. 1) and determining whether roles are over-privileged based on the effective policies. In such an embodiment, policy engine 120 may execute code in memory to perform certain steps of method 300. While method 300 of FIG. 3 will be discussed below as being performed by policy engine 120, other devices may store the code and therefore may execute method 300 by directly executing the code. Accordingly, the following discussion of method 300 will refer to devices of FIG. 1 as an exemplary non-limiting embodiment of method 300. Moreover, method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art(s).

In 310, policy engine 120 may identify policies associated with each role to be evaluated for compliance with permission controls. In an embodiment, enterprise system 110 may initiate compliance monitoring of roles in its system by retrieving policies, such as policies 113A-113C, as part of compliance monitoring for roles in its system, including role 113. After retrieval, enterprise system 110 may provide policies for each role to policy engine 120. Policy engine 120 may perform this step for each role to be evaluated and may include every role that is provided in enterprise system 110. Accordingly, policy engine 120 may receive and identify policies associated with all roles in enterprise system 110 as part of compliance monitoring.

In 320, policy engine 120 may identify permissions associated with each received policy. For example, policy engine 120 may identify permissions 201A-201C from policies 200A-200C respectively. In an embodiment, policy engine 120 may parse each policy and extract permissions from each parsed policy as part of identifying the permissions. As similarly noted in the prior step, policy engine 120 may perform this step for each policy in each role to identify every permission associated with each role.

In 330, after identifying each permission associated with each role, policy engine 120 may generate an effective policy by merging all identified permissions associated with a role into a single comprehensive policy. For example, policy engine 120 may generate effective policy 210 based on permissions 201A-201C. In an embodiment, merging the permissions includes inserting permissions into the effective policy and grouping permissions based on their association with a particular resource. For example, permission_1A, permission_1B, permission_1C are grouped based on their association with a first system resource to form effective permission 211A. Permissions for the particular resource may be distributed across multiple policies and merging allows for the permissions to be grouped together within the effective policy. In an embodiment, merging permissions is based on identifying an intersection of allowed and denied permissions across the different policies. In an embodiment, merging the permissions may also include correcting syntax of the permissions to comply with syntax requirements for policies. Policy engine 120 may generate an effective policy for each role to be monitored at this step.

In 340, for each role to be monitored and for each system resource that can be accessed via IAM system 130, policy engine 120 may calculate an effective permission based on the grouped permissions. Policy engine 120 may generate an effective permission for each system resource. For example, policy engine 120 may calculate effective permission 211A for the first system resource, effective permission 211B for the second system resource, effective permission 211C for the third system resource, and effective permission 211D for the fourth system resource. Accordingly, an effective policy for a role may include a number of effective permissions that directly corresponds to the number of system resources protected from access by IAM system 130. Each effective permission may define an effective scope for accessing its associated system resource. Policy engine 120 may therefore determine the effective scope for accessing a system resource from the calculated effective permissions in the effective policy. For example, the number of effective permissions may define the effective scope. Policy engine 120 may perform this step for each role to be monitored for compliance. In this manner, each effective policy provides the effective scope for a role to access each system resource in IAM system 130.

In 350, policy engine 120 may determine a permissible scope for accessing each system resource based on permission controls 123. As previously noted, permission controls 123 may define the boundary or maximum scope of access for system resources. In an embodiment, permission controls 123 may be implemented as a list or map of actions that are categorized based on level of risk to enterprise system 110. For example, actions may be categorized as safe, risky, or intermediate. Actions may be categorized differently depending on the role or the particular resource. For example, read/write access may be categorized as safe for administrative roles but read or write access may not be permitted for certain system resources even for administrative roles. In an embodiment, the permissible scope may be defined by the number permissions (e.g., safe actions). The maximum scope of access for system resources may be managed and provided by IAM system 130. Enterprise system 110 may be allowed to modify or otherwise customize the scope of access for its own environment and roles but may not be allowed to exceed the maximum scope provided by IAM system 130.

In 360, policy engine 120 may generate a notification to be transmitted to enterprise system 110 indicating any roles that are over-privileged. Policy engine 120 may determine that a role is over-privileged based on comparing, for each system resource, the effective scope of access calculated in 340 with the permissible scope of access determined in 350. The generated notification may be addressed to users associated with the over-privileged role, administrators of enterprise system 110, or both. Notifications may include remediation actions to correct the permissions that lead to the role being over-privileged. In an embodiment, the notification may include the effective policy, the effective permission(s) that cause the role to be over-privileged, and/or the permissive scope of actions from permission controls 123 that were violated by the effective policy.

In an embodiment, the notification may cause enterprise system 110 to automatically disable user accounts associated with the over-privileged role or otherwise restrict access requests submitted by those user accounts or devices associated with those user accounts until an appropriate action occurs.

Figure 4:
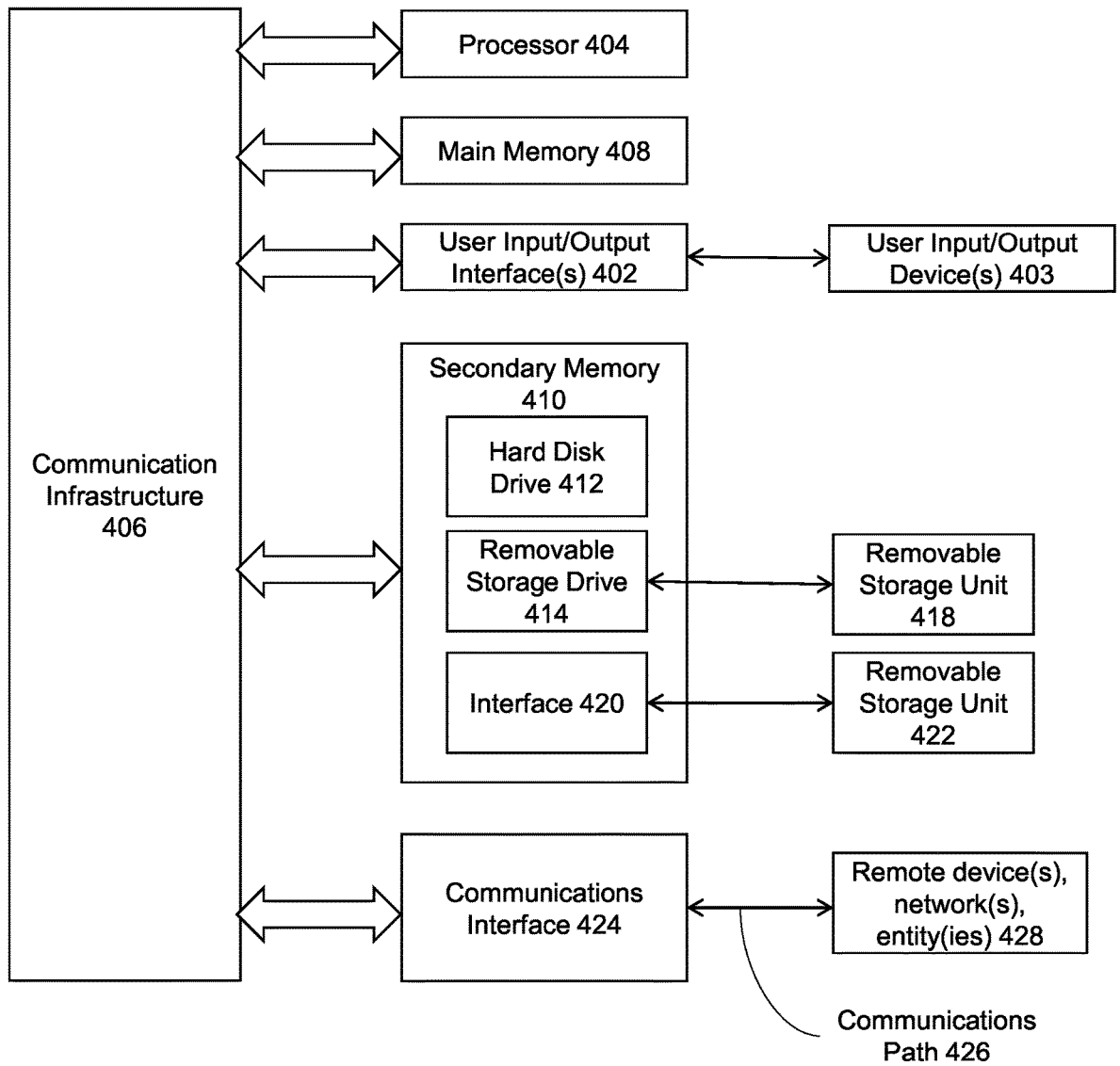
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 408, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A computer-implemented method for determining whether to permit access to a system resource, the method comprising:
   merging a plurality of permissions including a first plurality of permissions associated with a first policy and a second plurality of permissions associated with a second policy into an effective policy, wherein the first plurality of permissions includes a first permission defining a first scope of access to the system resource and the second plurality of permissions includes a second permission defining a second scope of access to the system resource, and wherein the first and second policies are assigned to a role;
   calculating, using the effective policy, an effective permission for the role to access the system resource based on the first scope of access to the system resource and the second scope of access to the system resource, wherein the effective permission defines an effective scope of access to the system resource;
   detecting, prior to a request for access to the system resource from a device associated with the role, that the effective scope of access in the effective permission exceeds a permissible scope of access in a permission control associated with the system resource, wherein the permissible scope of access defines actions that are performable on the system resource;
   generating a notification that the role is over-privileged based on the detecting, wherein the notification is associated with a system resource operation; and
   restricting the request from being transmitted from the device associated with the role based on a determination that the system resource operation has not been completed.

2. The computer-implemented method of claim 1, wherein the merging the plurality of permissions comprises:
   generating a new file representing the effective policy;
   inserting the plurality of permissions into the new file; and
   correcting syntax of the plurality of permissions within the new file.

3. The computer-implemented method of claim 1, wherein the role is associated with a machine or a user.

4. The computer-implemented method of claim 1, wherein the first scope of access defines a first set of allowed functions associated with the system resource and the second scope of access defines a second set of allowed functions associated with the system resource.

5. The computer-implemented method of claim 4, wherein calculating the effective permission comprises:
   comparing, using the effective policy, the first set of allowed functions and the second set of allowed functions, wherein the effective scope of access is based on the comparing.

6. The computer-implemented method of claim 5, wherein calculating the effective permission further comprises:
   merging the first set of allowed functions and the second set of allowed functions to generate the effective permission.

7. The computer-implemented method of claim 1, wherein the first scope of access to the system resource is different from the second scope of access to the system resource.

8. The computer-implemented method of claim 1, wherein the plurality of permissions includes a third plurality of permissions associated with a third policy and the third plurality of permissions includes a third permission defining a third scope of access to the system resource.

9. The computer-implemented method of claim 8, wherein merging the plurality of permissions into the effective policy further comprises merging the third plurality of permissions with the first plurality of permissions and the second plurality of permissions.

10. The computer-implemented method of claim 9, wherein calculating, using the effective policy, the effective permission for the role to access the system resource further comprises:
    merging, using the effective policy, the first scope of access, the second scope of access, and the third scope of access; and
    defining the effective scope of access based on the merging.

11. An apparatus for determining whether to permit access to a system resource of a plurality of system resources, the apparatus comprising:
    a memory; and
    a processor communicatively coupled to the memory and configured to:

prior to a device associated with a role submitting a request for access to the system resource:
  merge a plurality of permissions including a first plurality of permissions associated with a first policy and a second plurality of permissions associated with a second policy into an effective policy, wherein the first plurality of permissions includes a first permission defining a first scope of access to the system resource and the second plurality of permissions includes a second permission defining a second scope of access to the system resource, and wherein the first and second policies are assigned to the role;
  calculate, using the effective policy, an effective permission for the role to access the system resource based on the first scope of access to the system resource and the second scope of access to the system resource, wherein the effective permission defines an effective scope of access to the system resource;
  detect, prior to a request for access to the system resource from the device associated with the role, that the effective scope of access in the effective permission exceeds a permissible scope of access in a permission control associated with the system resource, wherein the permissible scope of access defines actions that are performable on the system resource;
  generate a notification that the role is over-privileged based on the detecting, wherein the notification is associated with a system resource operation; and
  restrict the request from being transmitted from the device associated with the role based on a determination that the system resource operation has not been completed.

12. The apparatus of claim 11, wherein to merge the plurality of permissions, the processor is further configured to:
  generate a new file representing the effective policy;
  insert the plurality of permissions into the new file; and
  correct syntax of the plurality of permissions within the new file.

13. The apparatus of claim 11, wherein the role is associated with a machine or a user.

14. The apparatus of claim 11, wherein the first scope of access defines a first set of allowed functions associated with the system resource and the second scope of access defines a second set of allowed functions associated with the system resource.

15. The apparatus of claim 14, wherein to calculate the effective permission, the processor is further configured to:
  compare, using the effective policy, the first set of allowed functions and the second set of allowed functions, wherein the effective scope of access is based on the comparison.

16. The apparatus of claim 11, the processor is further configured to:
  responsive to comparing the permissible scope of access to the effective scope of access:
    generate a remediation step for correcting the effective scope of access to comply with the permissible scope of access; and
    transmit the notification comprising the remediation step to the device.

17. The apparatus of claim 11, wherein the first scope of access to the system resource is different from the second scope of access to the system resource.

18. The apparatus of claim 11, wherein the plurality of permissions includes a third plurality of permissions associated with a third policy and the third plurality of permissions includes a third permission defining a third scope of access to the system resource.

19. The apparatus of claim 18, wherein to merge the plurality of permissions into the effective policy, the processor is further configured to merge the third plurality of permissions with the first plurality of permissions and the second plurality of permissions.

20. A non-transitory computer-readable medium storing instructions, the instructions, when executed by a processor, cause the processor to perform operations comprising:
  merging a plurality of permissions including a first plurality of permissions associated with a first policy and a second plurality of permissions associated with a second policy into an effective policy, wherein the first plurality of permissions includes a first permission defining a first scope of access to a system resource and the second plurality of permissions includes a second permission defining a second scope of access to the system resource, and wherein the first and second policies are assigned to a role;
  calculating, using the effective policy, an effective permission for the role to access the system resource based on the first scope of access to the system resource and the second scope of access to the system resource, wherein the effective permission defines an effective scope of access to the system resource;
  detecting, prior to a request for access to the system resource from a device associated with the role, that the effective scope of access in the effective permission exceeds a permissible scope of access in a permission control associated with the system resource, wherein the permissible scope of access defines actions that are performable on the system resource;
  generating a notification that the role is over-privileged based on the detecting, wherein the notification is associated with a system resource operation; and
  restricting the request from being transmitted from the device associated with the role based on a determination that the system resource operation has not been completed.

* * * * *